Feb. 13, 1951 R. I. COLIN 2,541,040
RADIO RANGE BEACON
Filed Feb. 5, 1946 2 Sheets-Sheet 1

INVENTOR.
ROBERT I. COLIN
BY
R. H. Morris
ATTORNEY

RADIO RANGE BEACON

INVENTOR.
ROBERT I. COLIN
BY
[signature]
ATTORNEY

Patented Feb. 13, 1951 2,541,040

UNITED STATES PATENT OFFICE 2,541,040

RADIO RANGE BEACON

Robert I. Colin, Nutley, N. J., assignor to Federal Telecommunication Laboratories, Inc., New York, N. Y., a corporation of Delaware Application February 5, 1946, Serial No. 645,668

11 Claims. (Cl. 343—102)

This invention relates to radio beacon systems and more particularly to long range radio beacon systems of the generally omnidirectional type.

It has been proposed that for reliability over long distances, radio beacon systems be provided operating at relatively low frequencies and with relatively narrow side bands. Such type of radio beacon system has been disclosed by way of example in applications of H. G. Busignies–P. R. Adams, Serial No. 607,982, filed July 31, 1945, now Patent No. 2,524,765 issued October 10, 1950, and H. G. Busignies–P. R. Alams–R. I. Colin, Serial No. 607,983, filed July 31, 1945, now Patent No. 2,510,065 issued June 5, 1950. In this general type of system it has been shown that very high reliability with reasonable power consumption may be expected if the system operates in a low frequency region from, for example, 70 to 100 kilocycles and utilizes extremely narrow modulation bands. Such systems may, under certain circumstances, be extended to cover a range up to 200 kilocycles with somewhat higher input power.

In a system described in the above-identified applications, however, certain disadvantages occur due to the fact that the beacon is not completely omnidirectional. Furthermore, manual adjustment of attenuations is provided for reading the indication. It is clearly preferable to provide a system of the type wherein no special attention of the dials need be given to operate the arrangement.

It is an object of my invention to provide a radio beacon system which will be substantially omnidirectional and will operate at low radio frequency ranges.

It is a further object of my invention to provide a radio beacon system wherein coarse or fine angles of indication may be measured depending upon the accuracy required.

It is a further object of my invention to provide a simple type of radio beacon wherein signals are transmitted in different directive space relationship and comparisons thereof may be obtained by simple amplitude comparison.

It is a still further object of my invention to provide a simple radio receiver circuit for a radio beacon of the type generally outlined above wherein indications of beacon direction and course may be obtained in response to received signals.

It is a still further object of my invention to provide a simple and reliable radio beacon system operative over relatively long ranges wherein signals of narrow band width may be utilized to produce indications of the relative angular position of the receiver with respect to the beacon and relatively close or wider adherence to a given course may be measured.

In accordance with a feature of my invention I provide a radio beacon consisting essentially of three transmitting antennas arranged in an equilateral triangle. Means is provided successively to energize the antennas in pairs so that different directional distribution of the energy is produced in different angular sectors of a circle about the beacon. For relatively coarse indications, within one or two degrees, the three antennas preferably are spaced less than a half wavelength apart, for example .4 wavelength apart, and are successively energized cophasally, one of the antennas being energized to produce an omnidirectional pattern at the beginning of each cycle of successive energization of the antenna pairs. These signals may be received on a mobile craft, the omnidirectional signal serving as a distributor synchronizing signal at the receiver, so that the successively received energies are applied to different windings of a three-coil ratiometer arrangement. The ratiometer needle will then assume a position dependent upon the resultant field in the three coils. Preferably condenser storage is provided for the signals so that the meter will normally retain its indicating position between pulse reception periods. Such a system should provide course indications within one or two degrees so that a craft will not depart from this angle.

It is frequently desirable that craft be enabled to maintain a course closer than one and two degree range outlined above. In such case the omnidirectional beacon may be built up of three antennas arranged in a substantially equilateral triangular form but spaced apart a plurality of wavelengths so that multiple lobe patterns are provided. Each pair of antennas is energized successively and during each period of energization a phasing subcycle of a plurality of separate phasing steps may also be used. In this case the omnidirectional synchronizing pulses are transmitted intermediate each successive energization. At the receiver the selection is made as to which of the pairs of antennas is to be used on the basis of determined position. The position determining may be obtained, for example, from a radio beacon of the type described above, by direction finding or by dead reckoning or other means. When the selection is made, the receiver serves selectively to separate the desired synchronizing pulse corresponding to the particular antenna pair in use. This pulse then serves through a distributor to apply the energy received for the various phase cycles to the separate indicator coils of the three-coil ratiometer. The two patterns representing the best comparison signals only are used, the third coil being disconnected or disabled from receiving energy in some manner so that a position dependent upon the relative strength of the energy received at these different phasing angles will be indicated.

Preferably the receiver is arranged so that by a manual switch adjustment the circuit may be adjusted to operate for either type of radio beacon.

A better understanding of my invention and the objects and features thereof may be had from the particular description which follows. It should be clear, however, that this particular description serves as an explanation of my invention and is not to be considered as a limitation on the general scope of the invention as outlined in the objects above. In the drawings.

Figure 1:
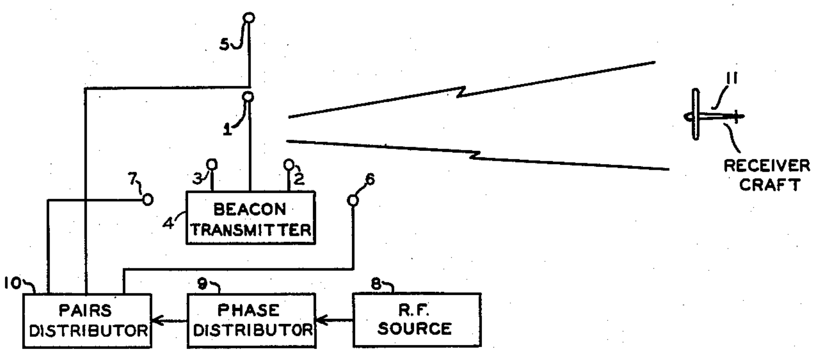
Fig. 1 represents schematically in block diagram the general set up of a beacon in accordance with my invention.

Turning first to Fig. 1, a radio beacon transmitter is represented comprising three antennas 1, 2 and 3 energized by the beacon transmitter 4. Beacon transmitter 4 incorporates distributor equipment cyclically to energize the three antennas cophasically in pairs. Thus, antennas 1, 2 may first be energized, then 2, 3 and then 3, 1. Intermediate this cycle one of the antennas may be energized alone. Preferably, the single antenna energization is for a shorter period than the others since this part of the cycle is used merely for synchronization. This cycle of energization will provide field patterns substantially as illustrated in Fig. 2, to be described later.

For finer course indications, a second beacon may be set up consisting essentially of three radiators 5, 6 and 7 arranged in an equilateral triangle which may be on the same center as the triangle formed by antennas 1, 2 and 3. Energy to antennas 5, 6 and 7 is supplied from a source 8 through a phase distributor 9 and a pairs-distributor 10 so that pairs 5, 6; 6, 7; and 7, 5; are successively energized. During each period of energization of pairs such as 5, 6, phase distributor 9 serves to alter the phase of energization of antennas 5 and 6 so that different distribution patterns are produced. Similarly, phase distributor 9 produces other phase shift subcycles in energy supplied antennas 6 and 7 during the period these two are energized, and antennas 7 and 5 during the period these are energized. The energy from radio beacons may be received on a receiving craft or other mobile unit indicated at 11 to produce indication selectively from antennas 1, 2 and 3 or from antennas 5, 6 and 7. Operation of the system will be clarified in explaining the system in more detail.

Figure 2:
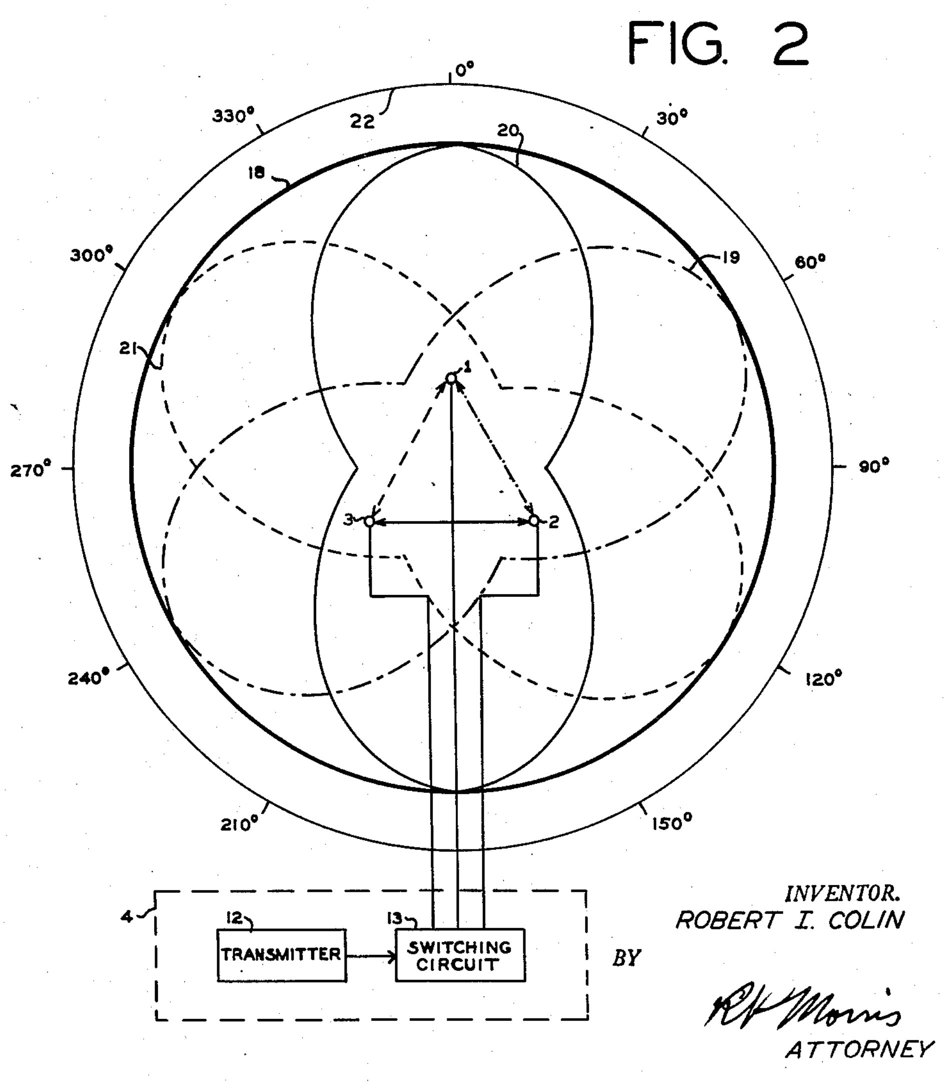
Fig. 2 illustrates the general set up of a radio beacon in accordance with my invention together with the field pattern distribution which may be expected for one form of radio beacon.

Turning now to Fig. 2, there are represented typical field patterns which may be produced by antennas 1, 2 and 3. The transmitter 4 is shown to comprise a radio frequency transmitting source 12 and a switching circuit 13. Switching circuit 13 is coupled to antennas 1, 2 and 3 so as to energize the antennas cyclically in four steps. In the first step, one only of the antennas is energized, preferably for a short period, producing effectively a pulse 14 (see Fig. 3) which may be considered as a synchronizing pulse. Antenna pairs 1, 2; 2, 3; and 3, 1; are then each successively energized by switching circuit 4 for periods represented by pulses 15, 16 and 17 of Fig. 3. When only one antenna is energized, an omnidirectional radiation pattern shown at 18 is produced. This pattern will be received by all craft in the vicinity of the beacon. When antennas 1 and 2 are energized, preferably cophasally, the radiation pattern shown in dot-dash lines at 19 will be produced. Successively thereafter, antennas 2, 3 will be energized producing pattern 20 and antennas 3, 1 producing pattern 21. Thus it will be seen as indicated by the scale 22 that a difference in amplitude ratio of energy from patterns 19, 20 and 21 will be produced about the beacon. It will be seen that only 180° ambiguity exists. This ambiguity can be resolved readily by ascertaining the general geographic position of the craft or may be resolved by direction finding on two or more beacons or other radiation points to locate generally the position of the craft.

Figure 3:
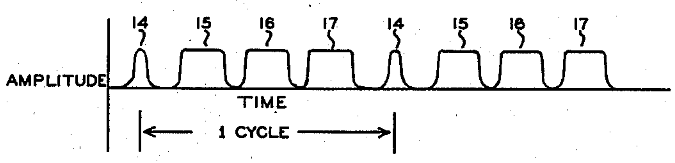
Fig. 3 is a graphical representation of the modulating cycle in accordance with my invention utilized in the pattern produced as shown in Fig. 2.
Figure 4:
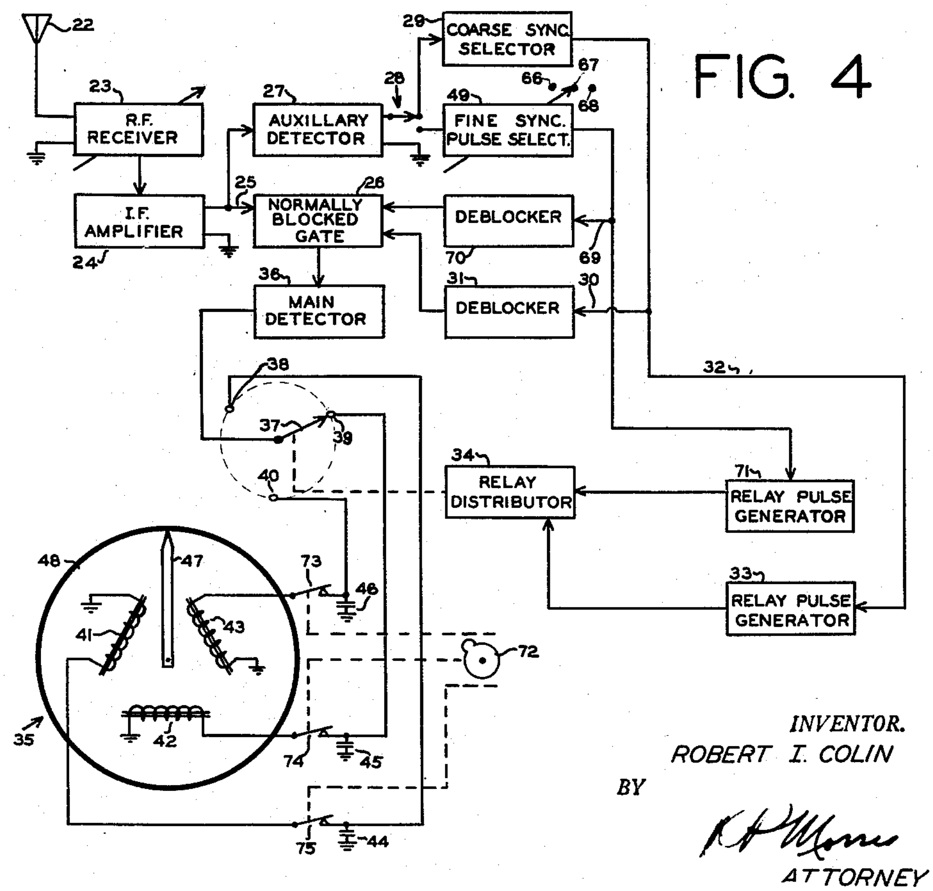
Fig. 4 is a schematic and block diagram of a receiver incorporating the features of my invention.

The operation of the radio beacon as shown in Fig. 2 may be more clearly understood turning to the receiver arrangement as disclosed in Fig. 4. The receiver of Fig. 4 may be mounted on any mobile craft or other location at which it is desired to ascertain the azimuthal position relative to the beacon. Energy may be received on antenna 22 and applied to the radio frequency receiver 23. Preferably, receiver 23 is tunable so that it may be tuned to different transmitting stations. Output energy from receiver 23 is applied to I. F. amplifier 24 and hence over line 25 to a normally blocked gate circuit 26. The output of amplifier 24 is also applied to auxiliary detector circuit 27 which serves to detect the received pulses reproducing the envelope pulse pattern such as shown in Fig. 3. Output of auxiliary detector 27 with switch 28, in the position shown, is applied to the coarse synchronizing pulse selector 29 which serves to segregate pulses 14 for the purpose of synchronization. These pulses are applied over branch line 30 and deblocker 31 to the normally blocked gate circuit 26. Deblocker 31 serves to produce deblocking pulses properly timed to pass at least a portion of pulses 15, 16 and 17. A second branch line 32 applies the synchronizing pulses to a relay pulse generator 33 which operates through a relay distributor 34 to distribute the pulses properly to the indicating receiver shown generally at 35. The pulse portions passed by gate circuit 26 are detected in the main detector circuit 36 and applied to switching distributor contact 37. Contact 37 operates through the functioning of relay distributor 34 successively to apply the signal to distributor contacts 38, 39 and 40 so that the energy is supplied successively to ratiometer coils 41, 42, 43 of indicator 35. Preferably storage condensers 44, 45 and 46 are provided so that energy applied during the contact period of switch 37 will be stored until the next succeeding application of energy. The indicator pointer 47 will then take a position relative to scale 48 dependent upon the resultant energy level within coils 41, 42 and 43. By maintaining pointer 47 in a predetermined position, a course directing toward the beacon may be readily followed.

It will be clear by reference to Fig. 2, that the spacing between antennas 1, 2; 2, 3; and 3, 1; preferably should be less than a half wavelength since it is desirable that the energy level does not drop to zero at any point. However, the spacing between the antennas also is preferably greater than a quarter wavelength at the operating frequency since it is essential for the best operation of the system that considerable contrast between amplitude levels be obtained.

Figure 5:
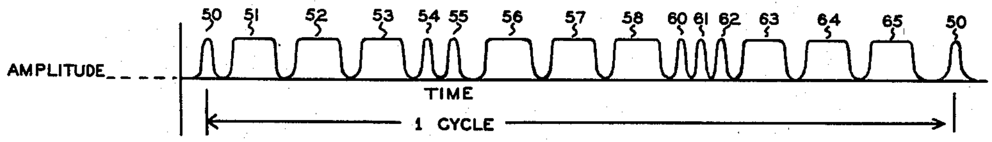
Fig. 5 is a graphical representation of the switching cycle usable for the long range beacon utilized for fine adjustment.

If an outer beacon for finer measurement is to be used with the receiver of Fig. 4, switch 28 may be operated to its lower position. Before further describing this system, it may be clearer if reference is first made to Figs. 1 and 5 explaining more fully the operation of the switching cycle of this beacon. The pairs-distributor 10 of Fig. 1 serves to energize first one of antennas 5, 6 or 7 to produce an omnidirectional pattern in the form of a single pulse of energy indicated at 50 of Fig. 5. Assuming first that antenna pairs 5 and 6 are energized following pulse 50, the energy is supplied to these antenna units with three different phase distributions in accordance with the adjustment of phase distributor 9. Thus, the antennas may be first energized 180° phase relationship then −60° and then +60°. Thus, three different distribution patterns are presented, the phases being 120° from one point to the next. These different periods of energization may be represented by pulses 51, 52 and 53. Next a single antenna is energized transmitting two pulses 54, 55 for the marker or synchronizing pulse indicating that antennas 6 and 7 are being energized. These antennas are in turn energized with different phase relationships as were 5 and 6 producing pulses 56, 57 and 58. In the next step the omnidirectional antenna is energized for the transmission of three pulses 60, 61 and 62 which serve as the composite synchronizing pulse. In turn then antennas 7 and 5 are energized with different phase distribution as previously explained for the periods as indicated by the pulses 63, 64 and 65 after which the cycle of energization is repeated.

In Fig. 4, with switch 28 in its lower position, the energy is still applied directly to the normally blocked circuit 26, but the auxiliary energy output from detector 27 is applied over the fine synchronizing pulse selector 49. The synchronizing pulse selector 49 has three adjusted positions indicated at 66, 67 and 68 serving to select pulses 50; 54, 55; or 60, 61, 62 depending upon the quadrant or sector in which the craft is located. A synchronizing pulse selector 49 may comprise for example, a width selector as described in the copending application of E. Labin et al. Serial No. 487,072, filed May 15, 1943, now Patent No. 2,440,278 issued April 27, 1948, for discriminating between the synchronizing pulses and the directive pulses and also a pulse separating circuit involving multiple delay paths as described in the Patent No. 2,266,401 to E. Reeves, dated December 16, 1941. As shown, the intermediate adjustment is illustrated indicating that antennas 6 and 7 are to be used. The selected pulse is then applied over a line 69 to the pulse deblocker circuit 70 which serves to deblock gate 26 for the passage of the three successive pulses 56, 57 and 58. A second relay pulse generator circuit 71 is also connected to the output of pulse selector 49. This relay pulse generator also is connected to distributor 34 to apply the receiver output pulses successively to the three ratiometer coils. As pointed out above, however, only energy from two of the patterns is to be used for comparison purposes. Accordingly, switch control means 72 is provided selectively to operate separate switches 73, 74, 75 provided in the individual ratiometer coil lines, so that the output energy from the normally blocked circuit is applied to two, only, of the ratiometer coils dependent upon which pair of patterns is being used for the beacon course indication. A calibrated chart may be provided to indicate to the operator which patterns are best for the position of the craft to enable proper selection of positions for switches 72, 73 and 74 and selector 49.

For both the types of indication, the same principles of long wavelength and narrow band modulation are desired in order to obtain the maximum reliability over long range. Furthermore, it will be clear that if desired direction finding, similar to that described in the aforementioned application, Serial No. 607,983, may be added to this system. The indicator 35 may carry different scales one for cooperating with the three closely spaced antennas 1, 2 and 3 and other scale calibrated in segments and sectors for operation with the radio beacon consisting of antennas 5, 6 and 7.

While the first-described system may provide accuracy of 1 or 2 degrees, the second type of system described accuracies varying between 1/10th to 1/20th of a degree may be expected. At a distance of fifteen hundred miles 1/10th degree represents an error of only two and a half miles.

It will be readily understood that while I have shown the simplest form of system in which each of the successive pairs of antennas constitutes units of the same equilateral triangular array, separate and independent pairs of radiators may be used if desired. The principles of distribution of energy will be the same whether or not the identical antennas are used as shown. However, in most cases it will be desirable to use the smallest number of antennas possible and that corresponds to the arrangement illustrated.

Furthermore, many different types of equipment may be used without departure from the scope of my invention as described herein. Other types of synchronizing signals may be used, and many different forms of indicators also. The various units indicated by blocks in the diagram have not been shown in detail since many forms of equipment to perform each of these functions are readily known to those skilled in the art.

I claim:

1. In a radio beacon system using a beacon which cyclically and successively transmits signals in a plurality of differently directed radiation patterns and a synchronizing pulse, an indicating receiver comprising means for selecting said synchronizing pulse, means under control of said selected pulse for selecting energy defining the different radiation patterns, and indicator means responsive to said received energy for indicating the azimuthal position of said receiver with respect to said beacon.

2. An arrangement according to claim 1 wherein said indicator means comprises a ratiometer having a plurality of separate field coils, and means responsive to said synchronizing pulse for cyclically applying said received directed energy successively to said coils for indicating the azimuthal position of said receiver with respect to said beacon.

3. A radio beacon system comprising a radio beacon comprising three antennas spaced each from the others a distance between a quarter and a half wavelength, and means for successively energizing one of said antennas to transmit an omnidirectional pulse and said antennas cophasally in pairs, whereby an omnidirectional synchronizing pulse and three directive overlapping patterns are cyclically produced.

4. A radio beacon system according to claim 3 further comprising mobile receiver means, means at said receiver for selecting said omnidirectional pulse, means responsive to said selected pulse for successively selecting energy transmitted for said antenna pairs, and means for comparing said successively selected energies to provide an indication of direction.

5. A radio beacon system comprising three antennas spaced each from the others a distance greater than one wavelength, means for energizing said antennas cyclically in pairs, means for cyclically shifting the phase of energization of the antennas of each pair during the periods of energization, and means for transmitting omnidirectional signals of different characteristics intermediate each cyclic phase shifting.

6. A radio beacon system comprising a radio beacon comprising three antennas spaced each from the others a distance between a quarter and a half wavelength and means for cyclically energizing one of said antennas to transmit an omnidirectional pulse and different pairs of said antennas successively to transmit overlapping directive radiation patterns, receiver means comprising a circuit including means for selecting said omnidirectional pulse and means for successively selecting energy from said overlapping patterns, and an indicator means for comparing the successively selected energy.

7. A radio beacon system comprising three antennas spaced each from the others a distance greater than one wavelength, means for energizing selected of said antennas cyclically in pairs and each pair in subcycle of different phasing and means for transmitting omnidirectional signals of different characteristics intermediate each subcycle, receiver means comprising a circuit including means for selecting a desired one of said omnidirectional signals, and means for successively selecting energy in response to said one omnidirectional signal corresponding to the phasing subcycle following said one signal, and an indicator means for comparing the successively selected energy.

8. A radio beacon system comprising a first radio beacon comprising three antennas spaced each from the others a distance between a quarter and a half wavelength and means for cyclically energizing one of said antennas to transmit an omnidirectional pulse and in succession selected of said antennas co-phasally in pairs to transmit overlapping directive radiation patterns, a second radio beacon comprising three other antennas spaced each from the others a distance greater than one wavelength, means for energizing said other antennas cyclically in pairs, and each pair in subcycle of different phasing and means for transmitting omnidirectional signals of different characteristics intermediate each subcycle, receiver means comprising a first circuit including means for selecting said omnidirectional pulse and means for successively selecting energy from said overlapping patterns, a second circuit including means for selecting a desired one of said omnidirectional signals, and means for successively selecting energy in response to said one omnidirectional signal corresponding to the phasing subcycle following said one signal, an indicator means for comparing the successively selected energy, and means for alternatively applying the selected energy from said first or second circuits to said indicator means.

9. A radio beacon system comprising a first radio beacon comprising three antennas spaced each from the others a distance between a quarter and a half wavelength and means for cyclically energizing one of said antennas to transmit an omnidirectional pulse and in succession selected of said antennas co-phasally in pairs to transmit overlapping directive radiation patterns, a second radio beacon comprising three other antennas spaced each from the others a distance greater than one wavelength, means for energizing said other antennas cyclically in pairs, and each pair in subcycle of different phasing and means for transmitting omnidirectionaal signals of different characteristics intermediate each subcycle, receiver means comprising a first circuit including means for selecting said omnidirectional pulse and means for successively selecting energy from said overlapping patterns, a second circuit including means for selecting a desired one of said omnidirectional signals, and means for successively selecting energy in response to said one omnidirectional signal corresponding to the phasing subcycle following said one signal, a receiver circuit, unblocking means for said receiver circuit, an indicator means for comparing the successively selected energy coupled to the output of said receiver means, and means for alternatively unblocking said receiver and applying the selected energy from said first or second circuits to said indicator means.

10. A radio beacon system comprising a first radio beacon comprising three antennas spaced each from the others a distance between a quarter and a half wavelength and means for cyclically energizing one of said antennas to transmit an omnidirectional pulse and in succession selected of said antennas co-phasally in pairs to transmit overlapping directive radiation patterns, a second radio beacon comprising three other antennas spaced each from the others a distance greater than one wavelength, means for energizing said other antennas cyclically in pairs, and each pair in subcycle of different phasing and means for transmitting omnidirectional signals of different characteristics intermediate each subcycle, receiver means comprising a first circuit including means for selecting said omnidirectional pulse and means for successively selecting energy from said overlapping patterns, a second circuit including means for selecting a desired one of said omnidirectional signals, and means for successively selecting energy in response to said one omnidirectional signal corresponding to the phasing subcycle following said one signal, a three winding ratiometer indicator means for comparing the successively selected energy, and means for alternatively applying the selected energy from said first or second circuits to the winding of said indicator means.

11. In a radio beacon system using a beacon which cyclically and successively transmits signals of the same carrier frequency in a plurality of differently directed radiation patterns, means for transmitting signals of said same carrier frequency in an omni-directional pattern intermediate each cycle of successive transmission, an indicating receiver responsive to said omni-directional pattern signals for synchronously selecting energy defining the differently directed radiation patterns, and indicator means responsive to said selected energy for indicating the azimuthal position of said receiver with respect to said beacon.

ROBERT I. COLIN.

REFERENCES CITED

The following references are of record in the file of this patent:

UNITED STATES PATENTS

| Number | Name | Date |
|---|---|---|
| 1,988,006 | Grieg | Jan. 15, 1935 |
| 2,120,303 | Ullbricht | June 14, 1938 |
| 2,228,692 | Davies | Jan. 14, 1941 |
| 2,241,918 | Muller | May 13, 1941 |
| 2,270,401 | Alford | Jan. 20, 1942 |
| 2,284,475 | Plebanski | May 26, 1942 |
| 2,288,196 | Kramar | June 30, 1942 |
| 2,288,815 | Luck | July 7, 1942 |
| 2,311,837 | Kandoian | Feb. 23, 1943 |
| 2,314,795 | Luck | Mar. 23, 1943 |
| 2,368,318 | Muller | Jan. 30, 1945 |
| 2,392,420 | Steinhoff | Jan. 8, 1946 |
| 2,406,396 | O'Brien | Aug. 27, 1946 |
| 2,406,468 | Loughlin | Aug. 27, 1946 |
| 2,406,970 | Smith | Sept. 3, 1946 |
| 2,413,637 | Loughlin | Dec. 31, 1946 |
| 2,448,016 | Busignies | Aug. 31, 1948 |